United States Patent
Todeschini et al.

(10) Patent No.: US 9,313,377 B2
(45) Date of Patent: Apr. 12, 2016

(54) ANDROID BOUND SERVICE CAMERA INITIALIZATION

(71) Applicant: Hand Held Products, Inc., Fort Mill, SC (US)

(72) Inventors: Erik Todeschini, Syracuse, NY (US); Stephen Patrick Deloge, Palmyra, NY (US); Donald Anderson, Locke, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 2 days.

(21) Appl. No.: 13/780,196

(22) Filed: Feb. 28, 2013

(65) Prior Publication Data

US 2014/0104451 A1   Apr. 17, 2014

Related U.S. Application Data

(60) Provisional application No. 61/714,422, filed on Oct. 16, 2012.

(51) Int. Cl.
*H04N 5/225* (2006.01)
*H04N 5/232* (2006.01)

(52) U.S. Cl.
CPC .............. *H04N 5/225* (2013.01); *H04N 5/232* (2013.01); *H04N 5/23212* (2013.01)

(58) Field of Classification Search
CPC ............................ H04N 5/23212; H04N 5/225
USPC .......................................................... 348/345
See application file for complete search history.

(56) References Cited

U.S. PATENT DOCUMENTS

| | | | | |
|---|---|---|---|---|
| 8,290,513 | B2* | 10/2012 | Forstall ............ | H04M 1/72544 455/414.3 |
| 8,478,772 | B2* | 7/2013 | Wong ................ | G06F 17/30427 707/760 |
| 2006/0202039 | A1* | 9/2006 | Wang et al. .............. | 235/462.27 |
| 2009/0005077 | A1* | 1/2009 | Forstall et al. ............ | 455/456.2 |
| 2010/0309364 | A1* | 12/2010 | Brunner ............ | H04N 5/23212 348/345 |
| 2012/0101993 | A1* | 4/2012 | Wong ........................... | 707/634 |
| 2012/0307126 | A1* | 12/2012 | Bhogal .................... | 348/333.11 |
| 2013/0222394 | A1* | 8/2013 | Fyke ............................ | 345/467 |

* cited by examiner

*Primary Examiner* — Ahmed A Berhan
(74) *Attorney, Agent, or Firm* — Additon, Higgins & Pendleton, P.A.

(57) ABSTRACT

A mobile device includes a camera, a user interface system, and a processor communicatively coupled to the camera and the user interface system. The processor is typically configured for running a first application. The first application is typically configured for (i) accessing the camera, (ii) upon the initialization of the first application, initializing the camera, and (iii) maintaining the camera in an initialized state as long as the first application is running. The application may be further configured for focusing the camera and maintaining the camera in a focused state as long as the first application is running.

20 Claims, 1 Drawing Sheet

ANDROID BOUND SERVICE CAMERA INITIALIZATION

CROSS-REFERENCE TO PRIORITY APPLICATION

This application hereby claims the benefit of U.S. Provisional Patent Application No. 61/714,422 for an "Android Bound Service Camera Initialization" (filed Oct. 16, 2012 at the United States Patent and Trademark Office), which is hereby incorporated by reference in its entirety.

FIELD OF THE INVENTION

The present invention relates to the field of mobile devices, more specifically, to mobile devices having improved camera initialization.

BACKGROUND

Mobile devices (e.g., smartphones and tablet computers) now typically have integrated cameras. Accordingly, numerous applications capable of utilizing an integrated camera have been developed for these mobile devices.

Many mobile devices having integrated cameras employ the Android™ operating system. Before an application running on an Android™ mobile device can use an integrated camera (e.g., to capture an image), the application must first initialize the camera. Once the application initializes the camera, the application must then tell the camera to autofocus before a usable image can be acquired. After acquiring an image, the application will then release the camera (e.g., for use by other applications). Accordingly, the camera must be initialized and focused the next time the application wishes to use the camera.

The steps of camera initialization and autofocus are rather slow, which can be particularly problematic for applications where quickly capturing images is important. Accordingly, a need exists for a more efficient way for applications on mobile devices, particularly Android™ mobile devices, to use an integrated camera.

SUMMARY

Accordingly, in one aspect, the present invention embraces a mobile device that includes a camera, a user interface system, and a processor communicatively coupled to the camera and the user interface system. The processor is typically configured for running a first application (e.g., a barcode scanning application). The first application is typically configured for (i) accessing the camera, (ii) upon the initialization of the first application, initializing the camera, and (iii) maintaining the camera in an initialized state as long as the first application is running. The application may be further configured for focusing the camera and maintaining the camera in a focused state as long as the first application is running.

In another aspect, the present invention embraces a mobile device that includes a camera, a user interface system that includes a visual display, and a processor communicatively coupled to the camera and the user interface system. The processor is typically configured for running the Android operating system. The process is also typically configured for running a first application. The first application is typically configured for, upon being initialized, (i) initiating a camera singleton class or initiating a local camera service by extending the Android service class and (ii) creating an instance of the camera object with the initiated singleton class or initiated local camera service. The first application is also typically configured for (i) running a first camera sequence for accessing image data from the camera and (ii) maintaining the instance of the camera object as long as the first application is running.

In a particular embodiment, the first application is configured for, upon being initialized, (i) initiating a local camera service by extending the Android service class and (ii) creating an instance of the camera object with the local camera service. In the particular embodiment, running the first camera sequence includes binding to the local camera service, after which the sequence captures an image from the camera.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a mobile device (e.g., a cellular phone, a smartphone, a personal digital assistant, a portable or mobile computer, and/or a tablet device) having improved camera initialization. The mobile device includes a camera communicatively coupled to a processor. The processor is configured to run a first application that accesses the camera. As long as the first application is running, it maintains the camera in an initialized state.

Figure 1:
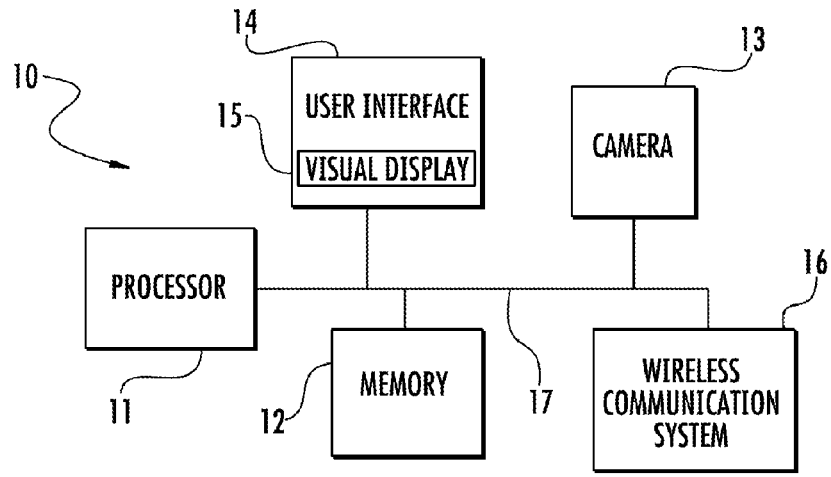
FIG. 1 depicts a block diagram of a mobile device in accordance with the present invention.

FIG. 1 schematically depicts an exemplary mobile device 10 in accordance with the present invention. The mobile device 10 typically includes a processor 11, memory 12, a camera 13, a user interface 14, and a wireless communication system 16. The processor 11 is communicatively coupled to the memory 12, the camera 13, the user interface 14, and the wireless communication system 16.

Exemplary mobile devices may include a system bus 17 and/or one or more interface circuits (not shown) for coupling the processor 11 and other components to the system bus 17. In this regard, the processor 11 may be communicatively coupled to each of the other components via the system bus 17 and/or the interface circuits. Similarly, the other components (e.g., the memory 12, the camera 13, the user interface 14, and the wireless communication system 16) may each be communicatively coupled to other components via the system bus 17 and/or the interface circuits. Other embodiments of system bus architecture providing for efficient data transfer and/or communication between the components of the device may be also be employed in exemplary embodiments in accordance with the present invention.

Typically, the processor 11 is configured to execute instructions and to carry out operations associated with the mobile device 10. For example, using instructions retrieved from the memory 12 (e.g., a memory block), the processor 11 may control the reception and manipulation of input and output data between components of the mobile device 10. The processor 11 typically operates with an operating system, more typically the Android operating system, to execute computer code and produce and use data. The operating system, other computer code, and data may reside within the memory 12 that is operatively coupled to the processor 11. The memory 12 generally provides a place to store computer code and data that are used by the mobile device 10. The memory 12 may include Read-Only Memory (ROM), Random-Access Memory (RAM), a hard disk drive, and/or other non-transitory storage media. The operating system, other computer code, and data may also reside on a removable non-transitory storage medium that is loaded or installed onto the mobile device 10 when needed. Exemplary removable non-transitory storage media include CD-ROM, PC-CARD, memory card, floppy disk, and/or magnetic tape.

The user interface 14 includes one or more components capable of interacting with a user (e.g., receiving information from a user or outputting information to a user). As depicted in FIG. 1, the user interface 14 includes a visual display 15. Typically, the visual display 15 is a touch screen, which is capable of displaying visual information and receiving tactile commands from a user. In addition to the visual display 15, the user interface 14 may also include one or more speakers, buttons, keyboards, and/or microphones.

As noted, the mobile device 10 typically includes a wireless communication system 16. The wireless communication system 16 enables the mobile device 10 to communicate with a wireless network, such as a cellular network (e.g., a GSM network, a CDMA network, or an LTE network), a local area network (LAN), and/or an ad hoc network.

The camera 13 may be any device that is able to capture still photographs and/or video. Typically, the camera 13 is able to capture both still photographs and video. Although FIG. 1 depicts the mobile device 10 as having a single camera 13, it is within the scope of the present invention for the mobile device 10 to include more than one camera.

The processor is configured to run an application that requires access to image data from the camera 13. In an exemplary embodiment, the application is configured to decode bar codes from image data received from the camera.

The application is configured so that upon being initialized (e.g., in response to a user input), the application initializes the camera 13. The application is further configured so that the camera 13 remains in an initialized state as long as the application is running.

After initializing the camera 13, the application typically focuses the camera 13 (e.g., by running an autofocus cycle). After initially focusing the camera 13, the application will typically maintain the camera 13 in a focused state (e.g., as long as the application is running). In order to keep the camera 13 focused, the application may be configured to regularly run the autofocus cycle for the camera 13. Alternatively, the application may maintain the focal distance of the camera 13 and only run additional autofocus cycles if it determines that the camera is no longer in focus.

During or after camera initialization, the application typically starts a sequence that will require access to the camera 13 (e.g., access to image data from the camera 13). This sequence may be started automatically (i.e., upon the initialization of the application) or upon receiving a relevant user command (e.g., a user command to begin a barcode scanning sequence). Once the sequence has started, the application will typically display a preview of the camera 13 (e.g., live image data from the camera's field of view) on the visual display 15. By displaying a preview (i.e., a preview of the camera's field of view), the application can help a user point the camera 13 in the desired direction. Once the preview is displayed, the application will capture, decode, and/or manipulate image data (e.g., live image data) from the camera 13. In this regard, the application may capture, decode, and/or manipulate image data upon receiving a relevant user command (e.g., a user command to scan a barcode). Alternatively, the application may automatically capture, decode, and/or manipulate image data (e.g., begin barcode scanning) once the preview is displayed.

Once the preview is displayed and before capturing, decoding, and/or manipulating image data, the application may be configured to determine if the camera 13 is in focus. If the camera 13 is in focus, the application will then proceed with capturing, decoding, and/or manipulating image data. If the camera 13 is not in focus, the application will run the autofocus cycle for the camera before capturing, decoding, and/or manipulating image data.

Once the image data has been successfully captured, decoded, and/or manipulated, the application may provide results to the user (e.g., via the visual display 15). Furthermore, once the image data has been successfully captured, decoded, and/or manipulated, the application may terminate the sequence and terminate the camera preview. Alternatively, the application may terminate the sequence and the camera preview upon receiving a user command.

In contrast with prior camera applications, this application will maintain the camera 13 in an initialized state, typically in an initialized state and a focused state, after the sequence accessing image data has been terminated and the camera preview has been terminated. In other words, the application does not release the camera 13 after terminating the sequence and the camera preview. Accordingly, the application will maintain the camera 13 in an initialized state even if the application is not being run in the foreground of the mobile device 10 (e.g., if live image data from the camera 13 is not displayed on the visual display).

By maintaining the camera 13 in an initialized state, the camera 13 will not have to be initialized the next time the application runs a sequence requiring access to image data from the camera 13. Accordingly, image data can be quickly captured, decoded, and/or manipulated.

During the termination of the application, the camera 13 is released. Once released, the camera 13 can be accessed by other applications.

In a particular embodiment, the processor 11 operates the Android operating system.

To initialize the camera 13 on the Android operating system, the application is typically configured to initiate a local camera service by extending the Android service class. The application then creates an instance of the camera object with the initiated local camera service. When the application starts a sequence that requires access to image data from the camera 13, the sequence binds to the local camera service object.

Alternatively, to initialize the camera 13 on the Android operating system, the application may be configured to initiate a camera singleton class. The application then creates an instance of the camera object with the initiated singleton class.

The instance of the camera object is maintained (e.g., in the local camera service or in the camera singleton class) as long as the application is running (e.g., when the application is not being run in the foreground of the mobile device 10). During the termination of the application, the camera 13 is released.

Figure 2:
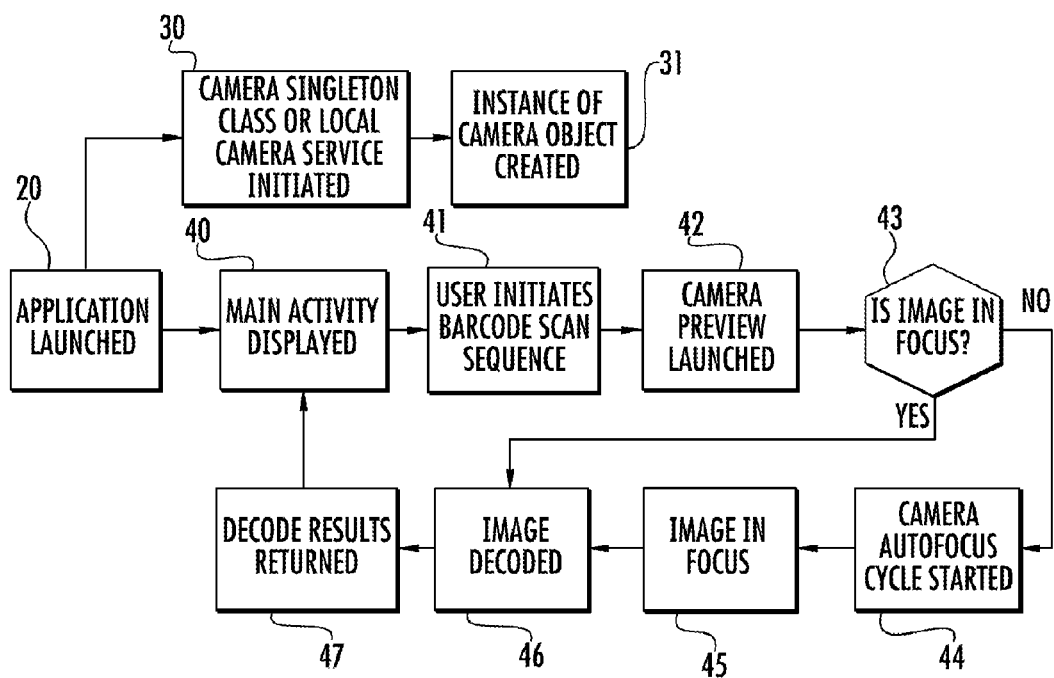
FIG. 2 depicts a flowchart for an exemplary barcode scanning application running on a mobile device in accordance with the present invention.

FIG. 2 depicts a flowchart for an exemplary barcode scanning application.

At step 20, the application is launched on the mobile device 10. After the application is launched, at steps 30-31, the application (i) initiates a camera singleton class or initiates a local camera service by extending the Android service class and (ii) creates an instance of the camera object with the initiated singleton class or initiated local camera service, thereby initializing the camera.

At step 40, the application initiates its main activity, which is typically displayed on the visual display 15. At step 41, the user initiates a barcode scanning sequence. At step 42, the application displays a preview of the camera 13 on the visual display 15. At step 43, the application determines if the camera 13 is in focus. If the camera 13 is in focus, the application decodes the image from the camera 13. If the camera 13 is not in focus, the application will run the camera autofocus cycle before decoding the image. The camera 13 may be maintained in a focused state by maintaining the focal distance of the camera 13 after performing an autofocus cycle.

In one particular embodiment, the application determines if the camera 13 is in focus by attempting to decode the image from the camera 13. If the image can be successfully decoded, the camera 13 is in focus, and the application can thereafter provide the image decoding results. If the image cannot be successfully decoded, the camera 13 is not in focus, and the application will run the camera autofocus cycle.

At step 47, the application returns the image decoding results.

Steps 41-47 may be repeated each time the user initiates a barcode scanning sequence. By maintaining the camera 13 in an initialized and focused state, the camera 13 does not have to be initialized and/or focused during each barcode scanning sequence.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A mobile device, comprising:
a memory storing a first application;
a camera; and
a processor, wherein said memory, said camera, and said processor are communicatively coupled by at least one interface circuit, the processor being configured for running said first application, the first application being configured for:
accessing the camera;
running a first camera sequence for accessing image data from the camera;
upon initialization of the first application, running an instance of a camera object maintained in said memory independently of said camera service;
maintaining the camera in an initialized state via the camera object as long as the first application is running and after the camera sequence accessing live image data from the camera has been terminated.

2. The mobile device according to claim 1, wherein the first application is configured for, upon initializing the camera, allowing an initial focusing of the camera on live image data.

3. The mobile device according to claim 2, wherein the first application is configured for maintaining the camera in a focused state in regard to image data from the camera as long as the first application is running.

4. The mobile device according to claim 1, wherein maintaining the camera in an initialized state as long as the first application is running, whether or not said camera is in use, comprises maintaining camera initialization when the first application is not accessing the camera, when a sequence accessing image data has been terminated, or when a camera preview has been terminated.

5. The mobile device according to claim 1, wherein maintaining the camera in an initialized state comprises, when the first application is accessing the camera, regularly running a camera autofocus cycle and maintaining a focused state and an initialized state when the application is not accessing the camera.

6. The mobile device according to claim 1, wherein the first application is configured for, during termination of the first application, releasing the camera.

7. The mobile device according to claim 1, further comprising a user interface system generating a visual display.

8. The mobile device according to claim 7, wherein the first application is configured for, while accessing the camera, displaying live image data from the camera on the visual display.

9. The mobile device according to claim 7, wherein the first application is configured for, when live image data from the camera is not displayed on the visual display, maintaining the camera in an initialized state.

10. The mobile device according to claim 1, wherein the first application is configured for decoding barcodes from image data received from accessing the camera.

11. A mobile device, comprising:
a memory storing a first application, a camera service, and a camera object in respective memory blocks;
a camera;
a user interface system, the user interface system comprising a visual display; and
a processor communicatively coupled to the camera and the user interface system, the processor being configured for running (i) the Android operating system and (ii) said first application within the Android operating system, the first application being configured for:
upon being initialized, (i) initiating a camera singleton class or initiating a local camera service by extending the Android service class and (ii) creating an instance of the camera object with the initiated singleton class or initiated local camera service;
running a first camera sequence for accessing image data from the camera; and
maintaining the instance of the camera object as long as the first application is running and after the first camera sequence accessing image data has been terminated.

12. The mobile device according to claim 11, further comprising a first camera sequence within said first application, wherein said first camera sequence comprises an instruction for binding said first application to the local camera service, and thereafter capturing an image from the camera.

13. The mobile device according to claim 11, wherein running the first camera sequence comprises capturing an image from the camera.

14. The mobile device according to claim 13, wherein the first application is configured for, before capturing an image, focusing the camera.

15. The mobile device according to claim 14, wherein running the first camera sequence comprises displaying a preview of the camera on the visual display before capturing an image from the camera.

16. The mobile device according to claim 15, wherein the first application is configured for maintaining the camera in a focused state in regard to image data previously accessed by the first application whether or not a preview of the camera is displayed on the visual display.

17. The mobile device according to claim 15, wherein maintaining the instance of the camera object as long as the first application is running comprises maintaining the instance of the camera object when a preview of the camera is not displayed on the visual display.

18. The mobile device according to claim 15, wherein maintaining the instance of the camera object as long as the first application is running comprises releasing the camera during termination of the first application.

19. The mobile device according to claim 15, wherein running the first camera sequence comprises, after capturing an image, decoding a barcode from the image.

20. A mobile device comprising:
   a camera;
   a memory separately storing a first application, a camera service, and a camera object in respective memory blocks, wherein said first application is configured to maintain said camera object in said memory independently of said camera service and further configured to run a first camera sequence for accessing image data from the camera;
   a processor configured to run said first application and said camera service;
   wherein said camera, memory, and processor are communicatively coupled by at least one interface circuit; and
   wherein said first application runs an instance of the camera object and maintains the camera in an initialized state as long as the first application is running and after the camera sequence accessing live image data from the camera has been terminated.

* * * * *